(12) United States Patent
Mohsenzadeh

(10) Patent No.: US 7,742,984 B2
(45) Date of Patent: Jun. 22, 2010

(54) SECURE AUTHENTICATION AND PAYMENT SYSTEM

(76) Inventor: Hossein Mohsenzadeh, 770 Boylston St. #14E, Boston, MA (US) 02199

( * ) Notice: Subject to any disclaimer, the term of this patent is extended or adjusted under 35 U.S.C. 154(b) by 2104 days.

(21) Appl. No.: 09/899,905

(22) Filed: Jul. 6, 2001

(65) Prior Publication Data

US 2004/0049455 A1 Mar. 11, 2004

(51) Int. Cl.
*G06Q 40/00* (2006.01)
(52) U.S. Cl. .......................... 705/39; 705/35
(58) Field of Classification Search ................ 705/35, 705/36 R, 37
See application file for complete search history.

(56) References Cited

U.S. PATENT DOCUMENTS

| | | |
|---|---|---|
| 4,611,094 A | 9/1986 | Asmuth et al. |
| 4,797,913 A | 1/1989 | Kaplan et al. |
| 4,908,850 A | 3/1990 | Masson et al. |
| 5,003,595 A | 3/1991 | Collins et al. |
| 5,022,067 A | 6/1991 | Hughes |
| 5,023,904 A | 6/1991 | Kaplan et al. |
| 5,119,295 A | 6/1992 | Kapur |
| 5,151,782 A | 9/1992 | Ferraro |
| 5,163,087 A | 11/1992 | Kaplan |
| 5,283,829 A | 2/1994 | Anderson |
| 5,383,113 A | 1/1995 | Kight et al. |
| 5,446,734 A | 8/1995 | Goldstein |
| 5,475,740 A | 12/1995 | Biggs, Jr. et al. |
| 5,526,406 A | 6/1996 | Luneau |
| 5,608,784 A | 3/1997 | Miller |
| 5,646,839 A | 7/1997 | Katz |
| 5,689,552 A | 11/1997 | Gibilisco |
| 5,722,067 A | 2/1998 | Fougnies et al. |
| 5,787,159 A | 7/1998 | Hamilton et al. |
| 5,822,413 A | 10/1998 | Dunn et al. |
| 5,854,975 A | 12/1998 | Fougnies et al. |
| 5,875,235 A | 2/1999 | Mohajeri |
| 5,875,401 A | 2/1999 | Rochkind |
| 5,963,625 A | 10/1999 | Kawecki et al. |
| 5,963,912 A | 10/1999 | Katz |
| 5,982,866 A | 11/1999 | Kowalski |
| 6,018,570 A | 1/2000 | Matison |
| 6,031,894 A | 2/2000 | Fleming, III |
| 6,038,443 A | 3/2000 | Luneau |
| 6,088,683 A | 7/2000 | Jalili |
| 6,154,727 A | 11/2000 | Karp et al. |

(Continued)

FOREIGN PATENT DOCUMENTS

WO    WO 99/30293 A2    6/1999

OTHER PUBLICATIONS

Personal Finance: Make money go round the world John Burke looks at ways of wiring funds overseas; [Foreign Edition] John Burke. The Independent. London (UK): Mar 24, 2001. p. 12.*

(Continued)

*Primary Examiner*—Lalita M Hamilton
(74) *Attorney, Agent, or Firm*—Cesari and McKenna, LLP

(57) ABSTRACT

A transaction and payment and processing system securely conducts transactions over the public telephone network. The transactions may be between and among entities of any type such as individuals, merchants, utilities, banks, etc. Nothing more than access to a telephone is required after initial registration of a user.

42 Claims, 2 Drawing Sheets

U.S. PATENT DOCUMENTS

Figure 1:
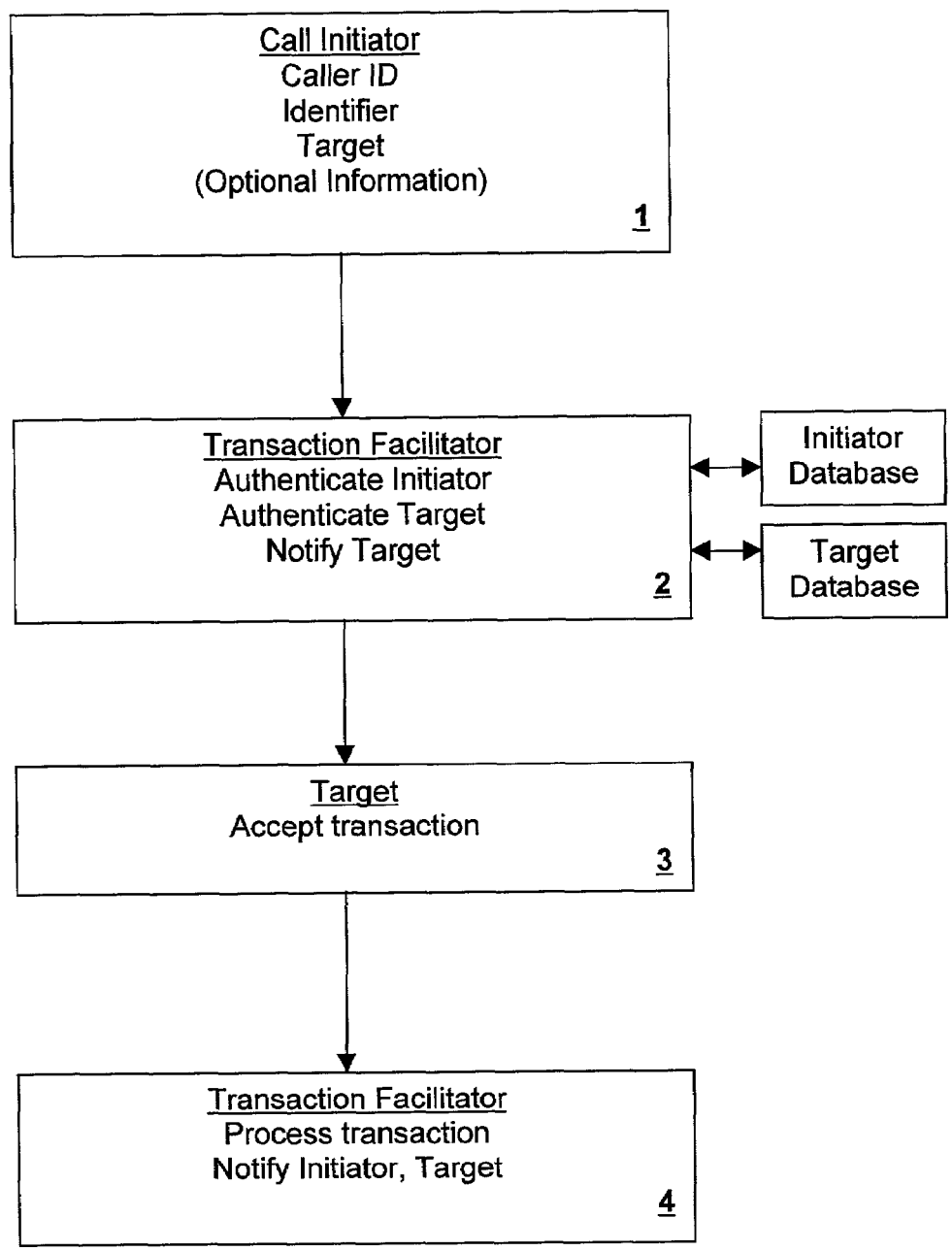

| | | | |
|---|---|---|---|
| 6,157,823 | A | 12/2000 | Fougnies et al. |
| 6,227,447 | B1 | 5/2001 | Campisano |
| 6,236,851 | B1 | 5/2001 | Fougnies et al. |
| 6,236,981 | B1 | 5/2001 | Hill |
| 6,240,441 | B1 | 5/2001 | Beckett et al. |
| 6,310,943 | B1 | 10/2001 | Kowalski |
| 6,393,113 | B1 | 5/2002 | Karras |
| 7,089,208 | B1 | 8/2006 | Levchin et al. |
| 7,136,475 | B1 * | 11/2006 | Rogers et al. .......... 379/213.01 |
| 2001/0021648 | A1 | 9/2001 | Fougnies et al. |
| 2002/0027980 | A1 | 3/2002 | Kowalski |
| 2002/0029193 | A1 * | 3/2002 | Ranjan et al. ................. 705/39 |
| 2002/0085963 | A1 | 7/2002 | Katz |
| 2002/0097854 | A1 | 7/2002 | Bauer |

OTHER PUBLICATIONS

Dime Savings Bank of New York, FSB Opens Fully Automated "DimeXpress" Near Times Square Business Editors. Business Wire. New York: Aug 4, 1998. p. 1.*

Soon, you may channel your banking via home TV Broberg, Leslie. Providence Business News. Providence, R.I.: Jun. 26, 1995. vol. 10, Iss. 11; Sec. 1. p. 5.*

Australian Patent Office Search Report for SG 200307782-3, J.W. Thomson, Feb. 16, 2005.

* cited by examiner

SECURE AUTHENTICATION AND PAYMENT SYSTEM

BACKGROUND OF THE INVENTION

1. Field of the Invention

The invention relates to authentication and payment systems and, more particularly, to secure authentication and payment systems.

2. Background Information

Authentication is a major constituent of essentially all commercial transactions. When individuals deal with each other face to face, authentication may be implicit if the individuals know each other. If they do not, authentication at various levels may be required before the transaction is allowed to be completed. For example, a photo ID such as a driver's license may be required by a party to the transaction before the transaction is allowed to proceed. Authentication is particularly a problem if the parties do not know each other and/or are not dealing with each other face to face. In such a case, various forms of identification, such as passwords, may be required as a condition of completion.

Authentication systems, of course, are adjuncts to payment systems. There are many systems used for exchange of value (payment) which include, but are not limited to, cash, checks and credit/debit cards. The latter are particularly vulnerable to fraud and theft, and account for substantial losses to merchants and financial institutions every year, despite significant efforts to authenticate the transaction of which they are a part.

Businesses which sell items of comparatively low cost have an especial need for transaction authentication which is simple and minimally intrusive but nonetheless robust. Purchasers of such items are largely members of the general public, often with limited patience. While they will accept some level of authentication in connection with a transaction, the level is generally not sufficient to ensure reliable authentication of all transactions, and customers will often refuse to deal with merchants who seek to impose higher levels of authentication. Thus, merchants frequently limit the authentication requirements that they impose, and therefore knowingly incur a predictable level of loss rather than lose customers who will not accept higher levels of authentication.

The cost of authenticating a transaction is also a major factor in its use. The cost of authentication must not be significant in relation to the cost of the article, else authentication may be omitted in order to induce the sale.

One of the first and still most widely used systems of authentication is the bank Automated Teller Machine (ATM) system that is used by many banks. In this system a financial institution issues to an individual an ATM card which is preprogrammed by the financial institution to be accepted by the network. The individual can then access finds and banking information by inserting or swiping the card using ATM specific apparatus which is connected to the network, either in real-time or through a dial-up service. The apparatus requests a PIN (personal identification number) from the user. After the individual has keyed in the PIN, the network matches the keyed PIN with a pre-recorded PIN. If the information matches exactly, the ATM network allows the individual to check his account balance, pay a bill, or receive currency from the machine, among other available transactions.

This level of authentication has been deemed acceptable to individuals and financial institutions, but it requires special apparatus (the ATM machines and the ATM cards) as well as a private communications network over which the transactions take place. Further, different banking networks belong to different ATM networks.

Authentication When Not Present (AWNP) has become an important issue in increasingly complex commercial transactions. Typically enterprises such as American Express®, VISA®), MasterCard®, banks or check-clearing networks and their affiliates (referred to collectively herein as Payment Networks (PN)) provide a unique apparatus to merchants that are connected to one or more PN's. In order to obtain authorization for a payment, the PN typically requires that the cards issued by them be swiped through the apparatus or that check numbers and other details be inputted on a keyboard by the merchant or by their agent. The merchant may also simply read the card or check data over the phone to the PN agent. The unique data is then transported on a network and authorization is obtained from the appropriate PN. The merchant then typically requires the customer to sign a template document to verify the purchase and the customer's responsibility for paying for the goods to the PN or, in the case of checks, to completing a check and signing it.

Sometimes a merchant will require a separate identification (ID), but in most circumstances, especially in the case of a PN card, the only authentication typically required is the PN card itself. After the customer signs the template document, the merchant relegates the responsibility for payment to the PN, relying on the authorization obtained from the PN and the signed document they have obtained from the customer. If the customer disputes the transaction, the merchant presents the document as a means of verifying the purchase.

This system relies on two premises:

1. That the customer will promptly report a lost or stolen card, so that a card presented by a customer to the merchant, if not previously reported lost or stolen, can be assumed to belong to the customer presenting it.
2. That the signature on the back of the card matches the template document after authorization has been obtained by the merchant.

There are many ways that fraud can occur in this arrangement. Some examples include, e.g., a card that has been stolen but not reported as such; a card that has not been signed by its authorized owner but has been signed by an unauthorized user instead; and failure of the merchant to check a signature when a customer signs the template document, among others. In the case of taking orders over a phone or on the internet, a card is not present and no signature is obtained to verify the customer; therefore, in most circumstances, if a customer disputes a transaction, the PN holds the merchant responsible, as the merchant was willing to proceed with the transaction without obtaining a signature. This is referred to in the card industry as "charge back", and can account for 2 to 10% of the value of the goods sold by the merchant. Additionally, most PN's require a higher transaction fee for Transactions When Not Present (TWNP), or for merchant classes that have higher proportion of their sales as TWNP, and thus the merchant's transaction costs are increased.

SUMMARY OF THE INVENTION

Despite the widespread adoption of the internet and the significant commerce which already takes place over it, a substantial portion of the public still does not use the internet for commercial transactions. For some of these the non-use is attributable to unfamiliarity with, or access to, computers which can access the internet. For others, it is due to lack of trust in the security features of the system.

Whether or not they have access to, or are able to or do, trust and use the internet, most people have long been accustomed to using the telephone and to conducting business over it. Unlike the internet, in which data can easily be intercepted by skilled hackers, telephone transmissions are difficult to intercept without specialized equipment and often then only with considerable difficulty. The main reason is that, with the telephone, communication takes place securely between two nodes within a channel, in contrast to the internet or other general public networks where multiple nodes have access to the same communication, thus allowing interception and hacking. This is the case both with landline telephones, in which the information being transmitted travels to a local central office via a unique circuit which is difficult to "tap" unobtrusively, as well as with wireless communications which may be encoded.

Telephone numbers are universally assigned uniquely to customers by the telephone company, and thus can serve as a unique identifier for a customer. The International Telecommunication Union (ITU) and all the global telephone operating companies have agreed to assigned country codes. For example, 1 identifies the United States, Canada and parts of Caribbean; 49 identifies Germany; and so forth. Furthermore, the various authorities and telephone companies in each country have decided on area codes and numbers for cities, areas or regions, e.g. 617 for Boston and 212 for parts of Manhattan. Within these areas, an individual subscriber is assigned a unique number. This numbering system allows, e.g., an individual in South Africa to simply dial the country code of the United States, the assigned area code, and finally the user number to reach a desired person or entity. This numbering system provides unique routing information which has been used primarily by Telephone Operating Companies (Telcos) for finding a subscriber, opening a circuit, and completing a call. The present invention uses this unique telephone numbering system as a principal identifier in routing and completing financial transactions and other transfer of goods and services.

In recent years various Telcos have made this number accessible to the users of the telephone system by way of "Caller ID" offering. In this service, the telephone number of the calling party is sent to the called party, along with the dialing information, thereby identifying the calling party. If the called party subscribes to the "Caller ID" service, he/she is thus enabled to see or otherwise ascertain the telephone number of the calling party in connection with the call. This number has been available internally to Telcos since the advent of electromagnetic switches in the early 20$^{th}$ century. It became more transparent through the advent of digital switching, especially the Class 5 switches in the early 1980's. The caller information was and is used for signaling, routing and billing by Telcos. Hereinafter we designate Caller ID and any other unique identifier of a Telco network subscriber simply as Caller ID.

Various further uses have been proposed and/or implemented for making use of this functionality for performing authentication functions in various contexts. For example, one of the telephone companies has proposed to use it for authenticating requests for call forwarding services. See U.S. Pat. No. 6,018,570, issued Jan. 25, 2000, for "Methods And apparatus For Regulating The Remote Ordering, Authorization, Access And Control Of Services And Service Features Associated With A Terminal". In that patent, the unauthorized ordering of call forwarding services for an unsuspecting customer, and its subsequent use to place long distance calls, is proposed to be defeated by checking the ID of the telephone from which the service is ordered and refusing to implement call forwarding on the targeted customer telephone unless the ID of the requesting telephone is the same as the ID of the customer telephone. Another proposes to use it over one network (e.g., the telephone network) to authenticate purchases over a second, separate network (e.g., the internet). See U.S. Pat. No. 6,088,683, issued Jul. 11, 2000 to Reza Jalli for "Secure Purchase Transaction Method Using Telephone Number". In that patent, a customer contacts a merchant over a first electronic network (e.g., the internet) which either the customer, or the merchant, or both may deem insecure, and places an order. In connection with the order, the customer identifies itself by supplying its telephone number and a registration number previously issued by a central registry. The registration number is obtained by either calling or writing the central registry in advance of any transaction. The merchant then generates an invoice that includes the customer identification information and transmits it to the central registry. In order to complete the transaction, the customer must then call the central registry and confirm the order. The central registry may verify the customer by any of various techniques, one of which optionally may include use of the customer's caller ID.

This proposal has a number of defects which limit its usefulness. First, the exclusive arena in which transaction occurs is the world wide web i.e. the internet. The telephone is used for authentication purposes only, and not as the initiator or medium of the transaction. Further, the transaction requires multiple sessions on the part of the user, allowing lapse of time which can diminish its value from both the customer's and merchant's point of view. Specifically, by separating in time the initial purchase decision and its final approval by the customer, a "second thought" on the part of the customer is more likely to occur, and thus reduce the number of transactions. Further, fraud can occur in the very registration process itself, since registration is to be accepted not only from the registrant's telephone, but also from alternate telephone numbers. Although various security checks are suggested in the latter case, use of caller ID is merely one option, leaving open the distinct possibility that information that was in fact stolen from another (e.g., a Social Security number) may form the basis of registration.

In contrast to the above, I have developed a secure system for transaction authorization and payment. The system requires the use of only a single session, and in most cases a single network, and is instantly accessible via a telephone network, mobile or landline device. This device need not necessarily be a telephone; it can be a Personal Digital Assistant or other device. The device, however, must be one having a pre-assigned unique number on a telephone network or on an IP telephony network through a pre assigned IP gateway. For ease of use hereinafter, I refer to such a device simply as a telephone, with the clear understanding that the term is intended to encompass not only voice-transmission and reception devices commonly understood by the term "telephone" (i.e., "conventional telephones"), but also personal digital assistants and other devices used for connecting to the telephone network and each having a unique number assigned to them. Of course, the device may share a given telephone number with other telephones of a user as is now commonly done with conventional telephones in the case of extension telephones. Similarly, for convenience of reference, I refer to the person using the device to pay bills, make purchases, transfer money or other assets, etc., as "the customer", whether an individual or an organization, and even though a particular transaction may not in fact involve the purchase or sale of goods or services. The authorization process of the present invention is rapid and largely transparent to the customer. It can be implemented with a single session between the customer and a third party such as a merchant, yet is sufficient to establish and complete a transaction, together with payment for it as appropriate.

Accordingly, it is an object of the invention to provide an improved authentication system for transactions between entities.

Another object of the invention is to provide an improved authentication system which facilitates consumer transactions.

Still another object of the invention is to provide an improved authentication system which is unobtrusive with respect to the user.

Yet another object of the invention is to provide an improved authentication and payment system.

Still a further object of this invention is to provide a simple yet relatively secure system for authenticating an individual or organization and allowing them to forward and/or swap funds, goods and services including, but not limited to, stocks, motor vehicle titles, or other assets or certificates representing value.

Still a further object of the invention is to provide an improved authentication and payment system which is reliable, yet unobtrusive.

Yet a further object of the invention is to provide an improved authentication and payment system which does not require the presence at a particular site of a customer using the system.

Still a further object of the invention is provide an improved system for authentication and/or payment which is geographically universal.

Still a further object of the invention is provide an improved system for authentication and/or payment which does not require special apparatus for its operation.

DETAILED DESCRIPTION OF THE INVENTION

In accordance with my invention, a customer conducts transactions securely by telephone with a "target". Such transactions may include, for example, the ordering of merchandise from a merchant; the payment of a bill to a merchant, a utility, etc.; the transfer of money to another person or merchant; the transfer of money from one account to another; or the transfer of assets or property from one entity to another, such as by transferring ownership of shares, etc., among other types of transactions. The transaction is performed either directly with the target or indirectly through an intermediary (hereinafter called for convenience "the Facilitator"). The Facilitator includes at least a data processor programmed to handle one or more portions of the transactions to be undertaken in connection with it. Typically, the Facilitator will include programs or program modules to receive a call over a telephone network; authenticate the call as described hereinafter; and process the transaction, such as by debiting and crediting various accounts or providing the required information for others to do so, or keeping records of the transaction or otherwise enabling the transaction in an orderly manner. As necessary, one or more of these functions may in fact be performed by a human being.

The Facilitator typically maintains two separate databases, the first of which defines the customers, and the second of which defines at least some of the targets with which a customer may undertake a transaction. The customer database includes fields containing at least the customer's registered Telephone Number and a customer-selected password (PIN), as well as data pertaining to a Funding Mechanism (hereinafter, "FM", e.g., an account or line of credit with the Facilitator or with a third party, a bank account, a credit card, debit card etc.) against which transactions undertaken by the customer may be debited. Additional fields are preferably included, however, including the customer's name and default address and shipping preferences, such as shipping address, shipping mode (e.g., parcel post, United Parcel Service®, Federal Express®); additional FM's (e.g., one or more credit cards, with their requisite identifying numbers and other information; bank accounts, bank routing numbers; credit facility provider, amount of credit available etc.) and other data useful in processing transactions. Similarly, the target database contains fields including at least a target identifier (e.g., a sequence number assigned by the Facilitator, the telephone number of the target, or simply the name of the target) and a payment destination identifier that defines the entity into which authorized payments are to be made (e.g., an account with the Facilitator, an account with a bank, etc.).

Preceding completion of a transaction between two entities (which term is intended to encompass individuals as well), the Facilitator registers at least one of the parties to the transaction. Typically, this occurs before either entity uses the system, but may occur after only a single entity has registered. In the latter case, registration of the other party or parties to the transaction is preferably sought to be made part of the transaction, although completion of the transaction need not be conditioned on this. In order to register, a call is place between the Facilitator and the entity to be registered, form which the primary identifier (i.e., the telephone number of the device to be registered to the entity) is obtained or verified. The entity then provides certain information such as a secondary identifier (e.g., password) to be associated with it and additional data such as its name, address, payment sources (in the case of a customer), destination account sources (in the case of a merchant or expected payee), or both (in case of those who will be both paying and receiving). Further data such as shipping preferences are desirably included. Where multiple alternatives are provided for a given data source (such as payment source, shipping mode, etc.), default preferences are established; these may simply be the first item listed in the respective categories. A key entry in each database is the Caller ID, which serves as the primary authenticator for the transaction, while a further preferably unique identifier such as a personal identification number (PIN) serves as the secondary authenticator for each transaction. A tertiary identifier may be provided for privacy. The collection of data comprises a "voice wallet" which may thereafter be used to facilitate transactions. Some or all of this information may be obtained instead from the telephone company which stores certain data in connection with devices registered with it, or may be verified against the data maintained by the telephone company.

As a specific example of a typical expected registration procedure, assume that a customer wishes to conduct transactions with or through the Facilitator. The customer preferably first registers with the Facilitator. This may include the following steps 1. The customer calls the Facilitator from a given telephone or other device to be registered. Information pertaining to the telephone number of the device used by the customer is already on record at the Telco, and in most circumstances has been verified by the Telco. This information includes the telephone subscriber's name, address (in case of land-line devices, the address where the telephone line is terminated), social security or other unique identification number, and credit check in most instances, among other information. The Telco database can also contain private unique information useful for identification, e.g., the mother's maiden name, etc.

2. The Facilitator retrieves the requisite information from the Telco's database and, if private information is contained in the database, may require the customer to input that information for purposes of further verification. It might also simply send a signup form through the mail to the customer. The Facilitator may then store some or all of this information in its database.

3. The Facilitator then requires the customer to input FM information. For example, in the case of a bank account, the Facilitator may require bank routing information and an account number. Of course more than one FM can be mapped to a telephone number (account). Additional information may also be requested from the customer by the Facilitator.

4. The Facilitator then verifies that certain key information of the Telco database matches corresponding key information input by the customer, e.g., social security or other unique identification number, banking or credit line information, etc. If it does, the Facilitator then links the requested funding mechanism to the telephone number and requests a PIN number from the customer; the linking is typically performed simply by establishing an association in the database between the customer telephone and PIN numbers and the funding information for that customer. As part of the linking process, the Facilitator preferably checks certain information (e.g., Social Security number, mother's maiden name, etc.) provided by the registering party against corresponding data on record with respect to that party at the telephone company, as well data that may be on record with the funding mechanism entity. Of course, a PIN number may already have been supplied by the customer to the Telco when the customer signed up for an account with the Telco, and in that case need not be supplied again by the customer. Further, as an additional security measure, the Facilitator may require a written confirmation via mail or email before proceeding with linking the FM identifier to the telephone subscriber's line. The registration can be also performed via the internet or by mail or email in which case after the customer fills in the information and submits it, the Facilitator verifies it against the telephone company data for the device to be registered and then, if it matches, proceeds to link the customer telephone number and PIN to the collected data.

The present invention is adapted to operate primarily in either of two modes. In a first, indirect, mode, the customer deals with the Facilitator only. For example if the customer wishes to engage in a transaction with a merchant target, the customer may initiate the transaction by calling the Facilitator on a telephone or other device which the customer has previously registered with the Facilitator and whose Identity (i.e. telephone number or other identity uniquely assigned by the telephone operating company or other authorities) is thus stored in the Facilitator database. The Facilitator verifies the customer's identity at a first level of authentication by checking the Caller ID associated with the call against the information contained in the database. The customer next provides a password that is preferably unique to it; this may be done verbally, or by entry on a Touchtone® telephone. The Facilitator then verifies the password. Of course, the Facilitator may delay verification of the Caller ID until the password is received, and then verify both together. Next, the customer identifies the target and the transaction to be performed with it. For example, the customer might say: "Pay Sunshine Floral Shop of Boston 97.50 and charge my Empire Bank account number 837557". This information may, of course, alternatively be provided at the outset of the customer call, and held by the Facilitator pending customer verification. Additional data may, of course, be provided by the customer, and used in the transaction. For example, the customer may specify an item to be purchased, the quantity, shipping terms (e.g. United Parcel Service®, U.S. mail, etc.). The Facilitator confirms these requests against the target database and processes the transaction as described above. The key, however, is the telephone number of the customer, or the target, or both, which serves to uniquely identify one or both parties to the transaction.

The Facilitator responds by checking the account of the target, Sunshine Floral Shop of Boston. If no such account exists, the Facilitator may establish a default account to which the finds are temporarily credited. The default account is preferably simply defined by at least the target's telephone number. In connection with this, it preferably notifies the customer of this action. The Facilitator may also contact the target and offer it the opportunity to register an account with the Facilitator. If the target account already exists, the Facilitator verifies the data required to complete the transaction. If the registered data does not match the data given by the customer, the Facilitator notifies the customer, the target, or both, to resolve the issue. If the data does match, however, the Facilitator notifies the target of the desired transaction and requests approval by the target. This approval can be made during the call or at a time in the future. Any notification can consist of a telephone call, notification through a private network, an email, regular mail or any other means.

If qualified approval is obtained (e.g., the target approves of the transaction in general, but wishes to change the account into which the money is to be paid from its default account to some other account), the customer is notified and asked for approval if the requested change affects the stated terms of the transaction (e.g., the purchase price) but may not be notified if it does not (e.g., the destination of the payment when no destination is specifically designated by the customer) or if such transfers have been explicitly or implicitly preapproved by the customer. Similarly, if the target has been provided in advance with a blanket approval of all transactions requested to be paid from customers, the approval is not necessary and a preset account is credited and the customer's account is debited. Once an account has been approved or approval dispensed with, the Facilitator debits the designated customer account, credits the designated target account, and notifies both parties of the successful completion of the transaction. The customer need not in fat approve of the modification of the transaction. For example, a parent who wishes to make a payment to a child for a designated purpose (e.g., payment of college tuition) may block payment of amounts it sends to a child to any account other than a designated tuition-payment account, e.g., an account of the college itself.

The target need not be a member of the Facilitator's network. As long as it is a subscriber to the Telco and has a unique number, that number can be used for crediting and debiting funds or other assets. If the target's account is in credit, it can always forward funds to another telephone subscriber without explicitly registering with the Facilitator. If any funds or assets must be credited against an account with a FM i.e. a bank account etc., then registration is necessary.

The above transaction can be driven through an automated voice response system in a single step or in multiple steps to the extent necessary to accomplish the above task. In the above example, the transaction can be completed with a single phone call by the customer. In most instances, it is expected that the transaction will be completed without need for further input by the customer, and during the course of the call, which generally will be brief. Thus, a minimum of time is expected to elapse between the time the customer first initiates the transaction, and the time that the transaction is confirmed as complete. This minimizes the likelihood that a customer will change its mind during the transaction processing, an important consideration for merchants that deal in real-time purchases, such as goods that are advertised on the radio, on television, in print, and in other media.

A significant embodiment of the invention is the transfer of value or resources from one entity to another after authentication by using the unique Telephone Numbering system. For example, a customer who wishes, as a "transferor", to transfer money or some other resource, such as the title to a motor vehicle, or the ownership of a stock certificate to another ("the transferee") calls the Facilitator and identifies the transferee as the target of the transaction, such as by giving the transferee's telephone number; the amount of money to be transferred and the account against which the money is to be debited, in the case of a money transfer, or the data identifying the resource to be transferred and such other information as may be necessary or desirable for the transfer of the resource. The Facilitator then preferably checks the identity of the entity associated with the target's telephone number and reports this to the transferor for final approval, thereby providing an additional level of security to the transferor.

Once the transaction is approved within the transferor's account, a call or other form of notification is generated by the Facilitator to the transferee, in which the transferee is informed of funds or other resources which are available to him by transfer from the transferor. The transferee can then either register with the Facilitator (if not already registered) by providing his identity and other information, or may transfer the funds or resources to another target through the same procedure described above if this is permitted by the transferor or by the Facilitator. The transferee can be contacted by telephone, by email or by other means. As long as the target is uniquely identified through the phone numbering system or other means, the transaction can be carried through. In all cases a pre-approved PIN may be used. Also, a request to pay another can be notified to the facilitator by the customer by an email or a web page containing the telephone number of the target and all information required to complete the transaction. In this mode upon the receipt of the information the Facilitator generates a call and proceeds with completing the transaction. Finally, the customer can use the phone and request that a payment be made to a person where notification to the target is made through email or other modes like SMS messages on a mobile phone, or through checks to be issued etc.

Person-to-person (or entity-to-entity) transfers can securely be made in the course of a conversation between two parties in accordance with thee present invention. For example if, during the course of a conversation, one party to the conversation decides to pay money or transfer an asset to the other, it can put the other party on hold (or initiate a three-way call), contact the Facilitator, and arrange for the transfer. The Facilitator can instantly authenticate the calling party through Caller ID and approve or complete the transaction as appropriate.

In situations in which the identity of the party initiating the call is authenticated by means other than its telephone number, a party may initiate a transaction with another (the target) that is itself identified by a telephone number (Caller ID). In this mode, upon the receipt of the information, the Facilitator generates a call to the target and proceeds with the transaction. Alternatively, a party may initiate the transaction by calling the Facilitator using its telephone (so that its identity is established by its caller ID and password as described above) and initiate a transaction with another (the target) in a mode in which the target is communicated with other than through the telephone. Rather than having the customer initiate the call, the system may also work in reverse, i.e., the customer may be the target of a call made by the Facilitator at the request of a merchant, a landlord, a utility, etc. For example, a cable television broadcaster may use the system to present its monthly bills to customers for payment over the telephone. The broadcaster may provide the Facilitator with a list of its customers and the payments due from each. The Facilitator then dials each customer. The details of the bill such as the name of the requesting entity (here, the broadcaster), the amount of the bill, and other data as desired are then presented to the customer and the customer is asked for its assent to payment. Verification is ensured by means of the customer's telephone number which the Facilitator itself has dialed and, optionally, the password or other unique information provided by the customer when the call is answered. On receiving the assent of the customer, the requester (broadcaster) is notified for its records, and the Facilitator may directly proceed to complete the transaction by debiting and crediting the appropriate accounts if the requester so desires. The customer can request that the call be made, for example, 5 days later, or 3 days before the bill is due, or at the due date, etc. The system records this request and initiates the call in accordance with the request. The requests can also be setup on the internet at the Facilitator's web site. The customer can also directly call the Facilitator and request that the bills be paid. In this mode, the Facilitator verifies the customer's Caller ID and password, if necessary and proceeds with crediting the biller's account and debiting the customer's account.

It is important to note that under most circumstances described in this application, the Facilitator can check the Telco directory for a target's name or alias and report it to the subscriber. If the target's name is not listed in the directory then this can also be reported. In this way a validation occurs which builds confidence for the transaction.

In a second, direct, mode of operation of the invention, a customer contacts a target directly, instead of through the Facilitator. For example a customer desiring to purchase an item sold by a particular merchant calls the merchant on a register telephone. Before placing the order, the customer may inquire as to features of the desired item, price, availability, warranty, etc; this information is provided by the merchant. If the customer desires to proceed with the transaction, the merchant transfers the call to the Facilitator for authentication of the customer. The Facilitator authenticates the customer by means of the customer's telephone number and may also verify that the customer has sufficient funds to pay for the transaction and may, if desired, debit the customer account and credit the merchant account. Following authentication, the Facilitator may transfer the call back to the merchant for completion of the transaction or may, if desired, complete the transaction itself, preferably with confirmation to both the customer and the merchant. Completion by the Facilitator may encompass only some aspects of the transaction, such as the financial aspects of debiting and crediting the customer's account and crediting the merchant's account, with the rest (e.g., shipping) being performed by the merchant, or may encompass all further aspects of the transaction in its entirety.

Bill presentation and payment by a requester may be performed in the direct mode as well. Thus, the requestor calls the customer itself or the customer calls the requester but, on obtaining the customer's assent to payment of the bill (e.g., by authorizing a charge to a credit card, debit card, or other FM's), the requester transfers the call to the Facilitator for at least authentication of the customer. The Facilitator may perform only the authentication portion of the transaction, or may additionally perform some or all of the completion of the transactions (e.g., the financial aspects, accounting, and the like).

In an alternative mode, the customer can be physically present at the target's (e.g., merchant's) site. In this mode the customer provides the merchant a unique identifier, preferably his phone number or an alias provided by the Facilitator. The merchant then enters this information into a specific apparatus which is connected to a private or public network, or through a phone call to the Facilitator. The Facilitator then calls the customer or owner of the account for verification. The call may be made to the registered device primarily associated with the customer, or to a device whose number is associated with the customer in the customer database. Typically, the call is made to a mobile device. The customer can then approve the transaction. The approval can also be given by a surrogate for the customer such as a parent or any third party that owns the account and that is called instead of the customer. In any event, the approving entity provides a PIN and may select what FM to use for this transaction, among other attributes. The transaction may be completed by the merchant or by the Facilitator. In either case, the customer's purchase can be cleared and paid for without proceeding through any checkout line. The products can be picked up on leaving the store or shipped subsequently. The information provided by the customer about its account number can be provided verbally or through a card issued by the Facilitator, where the merchant swipes the card on a specific apparatus or reads the information via a telephone to the Facilitator. It can also be provided through infrared communication or other means of local communication, wirelessly or through coupling of the device carried by the customer to the one provided to the merchant by the Facilitator or its agent. Both direct and indirect mode of transactions can occur with this third mode. In any event, verification of the transaction is performed by telephone call by the Facilitator to the registered telephone number of the customer or the customer's surrogate (e.g., parent).

The call may alternatively be made on an approved device by the customer to the Facilitator, avoiding need for a callback, since the call itself provides to the Facilitator the caller's ID; additional customer information such as a secondary ID (e.g., the customer's PIN associated with the given device) may also be obtained by the Facilitator in connection with the call. In connection with all types of transactions defined herein, the customer or target may be provided with an "alias" by the Facilitator. This alias may be used to identify the customer to the merchant as one registered with the Facilitator, without compromising the private secondary identifier (password) used by the customer to authenticate itself to the Facilitator. This may be important with certain customers that do not desire to reveal their phone number to targets for privacy or other reasons. The Facilitator can decide to provide an alias for the shipping address, for payment information, to mask the customer's information to the target for privacy, or for other purposes, if required.

Either the target or the customer or both are identified by a predefined series of numbers or words or other means of unique identification, preferably the telephone number. However, the target may have been assigned more than one account, which in turn means that when a target is specified as a recipient of funds by a customer, in addition to the identifier a specific secondary identifier may also be presented for an accurate routing of information, including funds. This may apply to corporate entities where a corporate account is set-up with many subaccounts.

In certain circumstances, individuals have placed a bar on transmitting their Caller ID in connection with calls that they make. In such circumstances, the individual can often momentarily circumvent this by dialing an "opt-out" code such as *82 or the like. Further, in some organizations, a unique number for a telephone is not identified (for example, an office which displays a single number for all the extensions of the company), or Caller ID is barred without the ability for an individual to "opt out". In such circumstances, a call-back service may be used for all scenarios herein described. The number can be set up via phone, internet, mail, e-mail, etc after an initial account is set up. Then, when a call is generated from phone on which Caller ID is blocked, a password or secondary check, if necessary, is made. If the system is satisfied, it calls back on the pre-specified number. It might then require a further password, such as a secondary password and other means of uniquely identifying an individual before proceeding with any mode of operation herein described.

It is possible to have more than one account registered to a single phone number; for example, a husband, wife and child each having their own account from the same number. This is similar to a primary card holder in the credit card business, where a primary holder has an account and his/her spouse or child can have an account within the same credit line. In this circumstance the primary user, that is, the person of record with the phone company, must first register, and then allow any secondary person to register an account from the same number. Each individual may be assigned a unique PIN number, or a common number may be used. Each subaccount holder will be treated as a separate entity with their own FM and personal information. In some circumstances they can share funding sources. In order to identify the sub account a number or letter may be assigned by the Facilitator, for example 617 555 1111A, B etc.

As noted above, in certain circumstances, for example, a parent-child relationship, the child may be set up with an account in which provision is made for a call back to a parent. When the child then uses the system, or indeed even uses a physical credit card for purchasing goods and services, before the purchase is authorized, the Facilitator requests parental consent/approval prior to authorizing the purchase. This relationship can be extended to manager-subordinate as well, when a purchase is done by a subordinate, but approval has to be carried through by the manager. Of course a full report of transaction and summaries will be available to the parent, manager or any subscriber as such.

An individual or entity can also have multiple accounts linked together so as to operate an integrated account. This can be accomplished initially by setting up the first number, e.g., a home number, and then requesting the set up of a second number (e.g., a mobile device), a third (e.g., an office, a second home etc) or more. Each number can share FM's or have a unique FM or set of FM's linked to them. The individual can also request a callback service for any of the accounts. In this way the individual's account has a central location and can be reached via multiple devices (phone numbers), and integrated reports can be presented to the individual.

It is also possible to operate the system in an IP telephony environment. IP telephony typically has a unique IP address or telephone gateway, but this can be intercepted. In certain circumstance IPs are not static. Also, in contrast with the telephone numbering system, where a central authority regulates phone number issuance and management, due to the inherent nature of the internet as an open environment, there is no central controller of IP addresses, and therefore it is prone to abuse, especially for financial transactions. In accordance with the present invention, the Facilitator may be used to provide a gateway where an unauthenticated call can be initiated by the customer to a pre-assigned static IP address at the Facilitator. The Facilitator, based on pre-specified guidelines (e.g., previously disclosed sender IP address, a digital signature, unique information e.g., password, mother's maiden name, etc.) can establish and authenticate the individual. In connection with the authentication, the Facilitator generates a call to a pre-assigned phone number of the customer on the public switched network; obtains a password from the customer; and then originates a call or a message to a target. At the point of authentication, when the Facilitator has the required information, e.g., the current Caller ID, etc., it approves the transaction.

The present invention also readily lends itself to the secure and rapid transfer of money, either to the customer himself/herself or to others, or the transfer of money from one account of the customer to another within the same bank or another bank, as long as the FM/accounts have been established and registered with the Facilitator.

Credit lines may be made available to a registered customer by a bank or by the Facilitator itself. Thus, when registering for service, the Facilitator itself, either directly or through a third party, e.g., a bank, may provide credit to the phone account. The customer may call on this line as desired. The credit facility functions identically to the funding mechanism of the account outlined above; functionally it acts as a FM. When undertaking a transaction the customer, rather than selecting a credit card or bank account, requests the use of the credit facility. Of course more than one credit facility can be established for a single account by various credit providers or by the same provider. The user can select the provider when engaging in a transaction, just as he selected the FM prior to completing the transaction.

It is possible that either the target or the customer fund the account or receive funds in cash form directly or indirectly through a third party member of the Facilitator's network.

In funding the account, the customers can
1. Go to a bank branch, a Facilitator network member store, a Facilitator itself, a network member ATM machine, or other agents, herein refereed to as Network Members (NMs), pay cash, physically present a credit card to be debited, or present a check, among other acceptable payment instrument acceptable to the NM. The NM, after satisfying itself with respect to the availability of funds, will then directly, via a private or public network, provide a message to the Facilitator with the customer's account identifier, e.g., the phone number, which results in a credit to the account of the customer. The payment to the NM acts as another FM here. The NM may also simply provide the customer with a receipt containing a coded number, which can then be used by the customer in a manner similar to the funding card serial number described below.
2. Buy a pre-assigned funding card similar to the telephone cards in existence today. The funding card will have a serial number. Once registered as described previously, the customer can provide the funding card serial number to the Facilitator and receive a credit, based on the purchase price or a ratio of the purchase price, on the account which may then be used to do all the various different applications described herein, including sending funds to a target. In fact the funding card acts as another FM.

In case of payout of the funds in cash to the target or recipient, the target can receive funds if:

1. The customer has provided a specific address, for example a bank branch in Wichita, Kans. In this mode the intermediary (The specific bank branch, NM store or other NM's) will receive an instruction from the Facilitator with a recipient's details. The recipient is notified via a call, email, mail or other means. The recipient will then go to the bank branch, etc. and produce an ID or other means of authentication to receive the funds
2. A check can be mailed by the Facilitator based on the target's name and address as provided by the customer instruction. A one time or limited time use card can be issued to the target at the request of the customer. The target can use this card on NM ATM networks to receive funds in full or partially until the funds are exhausted. It is not necessary that the recipient have a telephone account or register with the Facilitator in this circumstance.
3. A permanent debit or ATM card can be issued to the recipient, which enables any customer to send funds to the target. It is not necessary that the recipient have a telephone account or register with the Facilitator in this circumstance.

It is possible for the present invention to be used for purchasing or transmitting funds via the internet or other networks. In this hybrid mode a call is made between a customer and the Facilitator and the customer is authenticated. The target of a transaction that is the subject of the call is identified by an email address or other pre-assigned electronic network address. The Facilitator emails the recipient and requests it to register with it or to establish an account, if an account has not previously been established. The procedure thereafter is identical to that described above. Similarly the customer can email funds or send funds through the internet or other networks after establishing and registering an account with the Facilitator that is linked to the customer's telephone number. The transfer can be accomplished by going to the Facilitator's web site and filling out details of the recipient, including the recipient's telephone number. After calling back the customer to authenticate the transaction, the Facilitator calls the recipient and the procedures described above used to complete the transaction.

It is possible to use the system for mass distribution of promotions or funds, like check runs and rebates, to designated targets. In this mode, a mass distribution list is set up by the Facilitator which rings the target's telephone numbers as provided by the merchant and informs them that they have funds in their telephone account. The targets can then perform all the functionalities described herein, including paying bills and paying other targets etc. Similarly in another mode, a customer can receive a specific serial number from a merchant, the number being associated with, for example, a rebate on a digital camera. The customer then calls a prespecified number at the Facilitator and after providing the serial number, may obtain transfer of the finds to his/her account immediately or, based on pre-specified arrangement, at some future date. It is also possible that some personal information is then provided to the merchant from the Facilitator's database containing consumer information.

It is also possible that calls could be generated by the Facilitator and products solicited to be sold on behalf of a merchant. If a customer responds to the promotion and agrees to purchase the goods, funds may be transferred from his/her account to the merchant and goods shipped accordingly.

Figure 2:
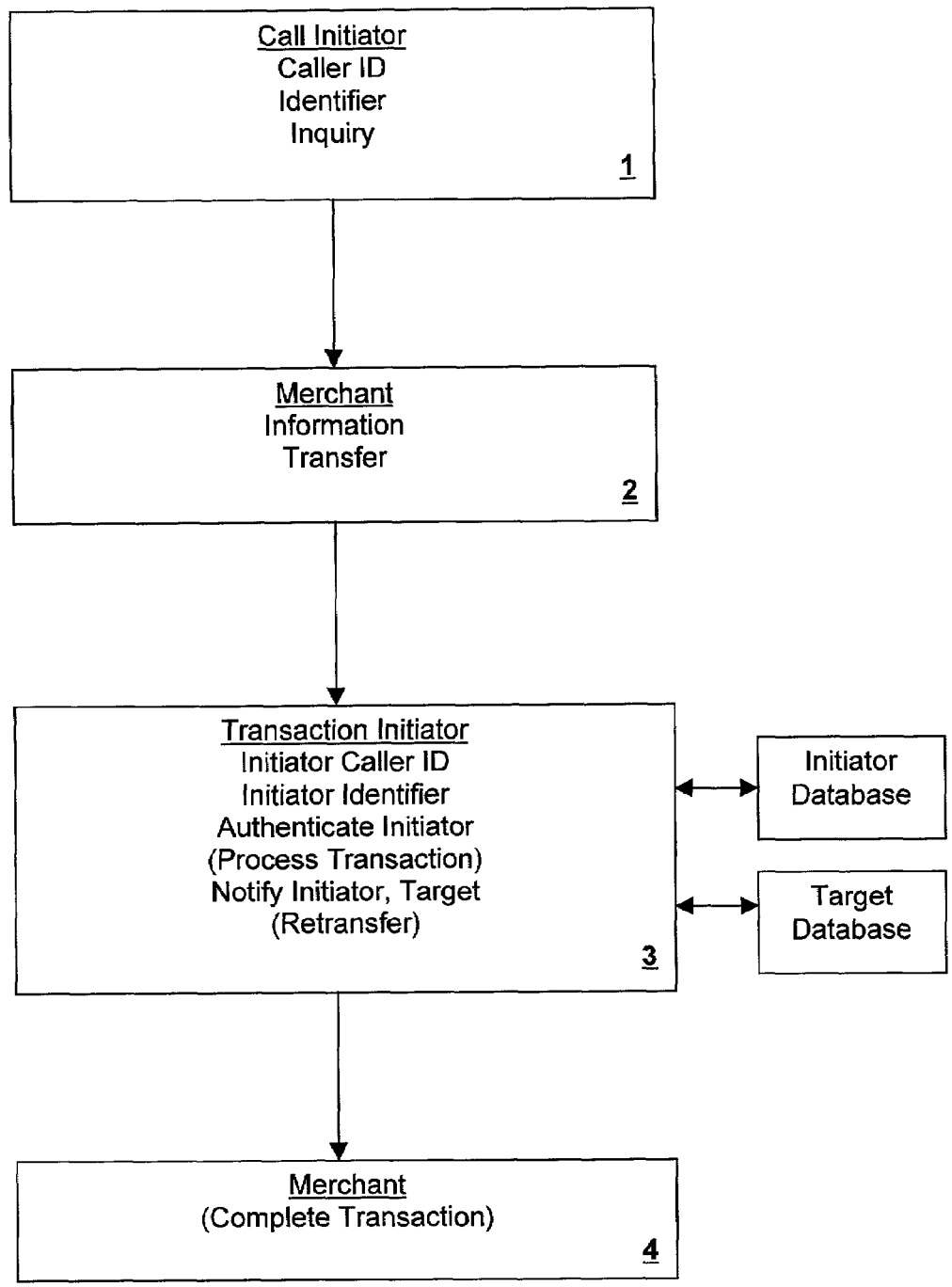

Illustrative examples of the manner in which the various entities (customer/requester, merchant, target) may interact with the Facilitator are shown in the accompanying drawings, in which:

FIG. 1 is a block and line diagram of a first form of authentication and payment system in accordance with the present invention; and FIG. 2 is a block and line diagram of a second form of authentication and payment system in accordance with the present invention.

In FIG. 1, a flow diagram of a first embodiment of a transaction processing and payment system in accordance with the invention is shown. To begin the process, a call initiator (e.g., a registered customer such as a consumer who desires to make a purchase or to transfer money from one account to another) places a call to a transaction Facilitator (step 1) on a registered phone (i.e., one whose Caller ID is registered with the Facilitator). The latter is a service provider that facilitates transaction processing and payment for entities such as consumers and businesses by authenticating the transaction initiator, and desirably the target of the call as well. The target may be, for example, a merchant, a bank, an individual, or other entity. For purposes of following the description, it may be helpful to think of the initiator as a consumer who wishes to pay a bill to a utility, although it will be understood that this example is for the purpose of explanation only, and that the invention is not so limited.

The initiator provides to the Facilitator a password (e.g., a personal identification number or PIN), preferably unique to the initiator, that serves as a secondary level of authentication; the primary level of authentication is provided by the Caller ID which is associated with the telephone handset that the initiator is using to place the call. The handset is desirably a landline phone, for maximum security against illegal interception, but may comprise a wireless phone instead. Information such as a password, and possibly other information as well, is entered by the initiator by voice or by telephone keypad in the case of touch-tone telephones.

The initiator identifies the target of the transaction (e.g., a public utility to which the initiator wishes to make payment of a bill) by voicing or keypad-entering an identifier for the target. This may be the target's name or it may be a unique identifier provided to the initiator by the target or from another source such as a directory and from which the target's record in the database can be accessed, either based on the identifier alone or on the identifier supplemented by additional information from the initiator or from other sources. Preferably, however, the target is identified to the Facilitator by its telephone number. This enables easy location of the target in the event that it is not already a registrant in the target database.

The Facilitator authenticates the initiator (step 2) by examining the Caller ID associated with the call to determine if it is a registered initiator. This is accomplished by comparing the initiator Caller ID with the initiator Database 10. The Facilitator also verifies the Caller Identifier (e.g., PIN) in a similar manner. If these two match a specific registrant in the database, the initiator is authenticated as that registrant. If they do not, the transaction is aborted. Various other actions may then be taken, such as asking the initiator to repeat the Identifier; notifying the registrant by voice mail of one or more failed access attempts; notifying public authorities; etc.

If initiator authentication is established, the Facilitator then preferably authenticates the target. This is typically accomplished in a similar manner to that of initiator authentication, but using a separate database 12. Of course the initiator and target databases may be combined in one but, because the two will generally have different data fields, it will generally be more efficient to use separate databases for them.

On establishing initiator authentication, the target is notified of the initiator's desire to undertake a transaction with it. If the target is already registered with the Facilitator, the target is given the opportunity to refuse the transaction, in which case the initiator is notified and the transaction is terminated. Typically, however, the target will accept the transaction (step 3) by transmitting its assent to the Facilitator. In connection with acceptance, the target may specify the account into which any payment is to be made if this has not already been established by the user. Additionally, the target may supply other data to shape the transaction, if the user has not specified to the contrary.

If the target is not already registered with the Facilitator, the target is given the opportunity to do so. It may do so in a manner similar to that in which a Call initiator registers, i.e., by providing to the Facilitator data such as a preferably unique identifier; a Caller ID (this, in fact, is provided by the telephone service provider), and other data that may be appropriate in connection with the transactions to be undertaken with or by it. After registration, which may take place wholly over the telephone and during the same session as that in which the target is notified of a desired transaction with it, and after acceptance of the transaction, the transaction is processed (step 4). Typically, this involves debiting an account of the Call initiator and crediting the account of the target. Finally, the initiator and the target are notified of completion of the processing, and the transaction is thereby completed. Of course, if registration by the target is refused, the initiator is notified and the transaction is terminated without processing such as debiting or crediting of accounts.

This mode of operation is suitable for a number of the transactions described in detail above. For example, one person (e.g., a parent) wishing to send money to another (e.g., a child) may readily do so by means of a single telephone call to the Facilitator, specifying the telephone number of the child and the amount to be transferred. Specific conditions, e.g., the particular account into which the money is to be transferred, forbidding retransfer to other accounts etc., may also be specified by the parent as desired and as permitted by the Facilitator.

FIG. 2 illustrates a second example of the invention, namely, one in which the call initiating a transaction is placed in the first instance not to the Facilitator but to a third party such as a merchant. For ease of understanding, it may be helpful to consider FIG. 2 in connection with a transaction in which a consumer calls a merchant to order a CD that it has just heard advertised, although it will be understood that the invention is not so limited. The transaction begins (step 1) with the Call initiator placing a telephone call to the merchant. The caller may make inquiry of the merchant prior to placing an order, such as to price, configuration, characteristics, warranty and the like, and may provide information to the merchant concerning itself such as name or alias, address, etc. The Caller ID of the initiator is captured in connection with the call, but it need not be used by the merchant; it may simply be transmitted to the facilitator.

In order to authenticate the initiator, the merchant transfers the call to the Facilitator. The Facilitator authenticates the parties to the proposed transaction (step 2) in the manner previously described in connection with FIG. 1, i.e., it checks the Caller ID and preferably a unique identifier of each party with the respective initiator and target databases; in the present case, the customer is the initiator and the Merchant is the target. If both checks match for each party, the Facilitator notifies the initiator of the transaction (step 3) and inquires as to acceptance. If the initiator accepts, the Facilitator notifies the target of the authentication of the initiator. At this point, the Facilitator may cease to participate further in the transaction, and the transaction may be completed by the Merchant/ target. The Facilitator's role in the transaction will thus have been to provide the authentication which gives the Merchant the security needed to proceed with the transaction, knowing that it is not fraudulent. Conversely, the Merchant may desire that the Facilitator complete the transaction. In this case, the Facilitator will complete the transaction in the manner previously described in connection with FIG. 1, e.g., by debiting and crediting the accounts of the Merchant and of the Consumer, respectively, notifying them both of the action, and terminating the call.

Although the above specific examples illustrate the present invention in the context of calls initiated by a customer, it will be understood that the invention is not so limited. For example, the initiator may be a merchant, a utility, or simply a third party who is presenting bills for payment, or a person or entity that seeks transfer of assets from another. In any event, authentication of at least one party to the transaction is accomplished by the Facilitator by means of the party's unique telephone ID (i.e., telephone number, or pre-assigned static IP address at the Facilitator), preferably in connection with a secondary identifier such as a PIN.

No unique hardware or software is required in order to implement the present invention. Existing communicant instrumentalities provide the necessary hardware, and the software is readily assembled from existing communications, database, and financial software modules, with any desired customization well within the skill of those skilled in the art of communications and software. Conventional stored program data processors can perform the necessary processing using such software. It is expected that most transactions will be processed by the Facilitator without the need for human intervention, although the Facilitator may provide such intervention when necessary or desirable.

CONCLUSION

From the foregoing, it will be seen that I have provided an authentication and payment system that provides a significant degree of security without the need for special devices. The system uses a unique identifier that is nearly universally available and that itself typically has undergone at least some level of scrutiny by independent third parties (e.g., Telcos) in connection with associating it with a particular device, e.g., a telephone, and with a particular individual or entity. Desired transactions can typically be initiated, authenticated, and authorized during a single phone call by a customer, and may frequently be completed during that call as well. Travel to specific facilities to initiate a transaction is not required, yet a security level higher than that commonly associated with "Authorization When Not Present" transactions is maintained.

Having illustrated my invention and having described preferred embodiments thereof, I claim:

1. A method of securely conducting a transaction over a network, comprising:
   A. receiving, at a server, a telephone call over the telephone network that seeks to initiate the transaction with a target;
   B. obtaining, at the server, at least a telephone number defining the telephone from which the call is being placed;
   C. authenticating, at the server, the call by checking at least the telephone number associated with the call against telephone numbers in a database of registrants' telephone numbers; and
   D. in response to at least said telephone number matching that of an entity registered in said database, performing instantly, at the sever, the transaction by transferring funds from a first financial account to a second financial account.

2. The method of claim 1 in which said database contains data uniquely identifying call initiators that are registered to undertake transactions on the system.

3. The method of claim 2 in which a transaction is completed only after authentication of both the call initiator and the target.

4. The method of claim 1 in which the steps of debiting and crediting said financial accounts in connection with completion of the transaction are performed by the target entity.

5. The method of claim 1 in which said transaction is completed by the target.

6. The method of claim 1 which includes the steps of:
   (1) obtaining from the call initiator a secondary identifier; and
   (2) using said secondary identifier in connection with authenticating the call initiator.

7. The method of claim 1 in which said database includes information concerning one or more desired payment mechanisms, and said payment mechanisms are linked to said telephone number.

8. The method of claim 1 in which said database includes information concerning one or more desired payment mechanisms and shipping preferences, and in which said information is retrieved by means of the telephone number and used in processing a transaction.

9. The method of claim 1 which includes the step of verifying to the sender of said call the identity of the designated target before completing said transaction.

10. The method of claim 9 in which said verification is performed by checking the given telephone number against information obtained from the telephone company.

11. The method of claim 1 wherein the first financial account is selected from a group consisting of a bank account, a credit card account, a debit card account and a prepaid card account.

12. The method of claim 1 wherein the transaction is cleared through an entity selected from a group consisting of an Electronic Funds Transfer network, a credit card network and an Automated Clearing House network.

13. The method of claim 1 wherein the second financial account is selected from a group consisting of a bank account, a credit card account, a debit card account and a prepaid card account.

14. A method of securely conducting transactions over a network, comprising:
   A. receiving, at a second location on a server, in a first network, a message placed at a first location on the first network and identifying a transaction to be undertaken;
   B. at the server at the second location on the first network, obtaining, from a source other than the initiator of said message, at least a telephone number defining the telephone from which the message was initiated;
   C. authenticating the message by checking at least the telephone number associated with the message against telephone numbers in a database of authorized telephone numbers; and
   D. in response to at least said telephone number matching an entity that is contained in said database, instantly completing the transaction by performing a transfer of funds from a first financial account to a second financial account using a second network.

15. The method of claim 14 in which said second location includes a facilitator entity which performs said authentication.

16. The method of claim 15 in which said facilitator transmits authentication to a telephone station at a third location for completion of said transaction.

17. The method of claim 14 in which said facilitator completes said transaction only on authorization from the target of said transaction.

18. The method of claim 14 in which said message is placed by an entity which initiates a payment to another.

19. The method of claim 14 in which said message is placed by an entity which is a target of payment.

20. The method of claim 19 in which said transaction is completed only upon approval by the entity which is to make said payment.

21. The method of claim 14 wherein the first financial account is selected from a group consisting of a bank account, a credit card account, a debit card account and a prepaid card account.

22. The method of claim 14 wherein the transaction is cleared through an entity selected from a group consisting of an Electronic Funds Transfer network, a credit card network and an Automated Clearing House network.

23. The method of claim 14 the first financial account is selected from a group consisting of a bank account, a credit card account, a debit card account and a prepaid card account.

24. The method of claim 14 wherein the second financial account is selected from a group consisting of a bank account, a credit card account, a debit card account and a prepaid card account.

25. The method of claim 14 wherein the database comprises information concerning one or more desired payment mechanisms and wherein said payment mechanisms are linked to said telephone number.

26. The method of claim 14 wherein the database comprises information concerning one or more desired payment mechanisms and wherein said information is retrieved using the telephone for use in processing the transaction.

27. Apparatus for facilitating transactions initiated over a telephone network, comprising:
   A. a data store for storing a database of at least authorized transaction initiators, said database containing, for each entity authorized to instantly engage in said transactions, at least a primary identifier identifying telephone instruments that are authorized for use in said transactions and a secondary identifier;
   B. a stored program data processor for processing transactions directed to it, said apparatus being connected to store data in said database and to retrieve it therefrom;
   C. one or more interfaces between said telephone network and said processor for receiving and transmitting data between said network and said processor;
   D. said processor programmed to:
      (1) receive said primary and said secondary identifiers from said telephone network via said one or more interfaces and to authenticate said identifiers against said database; and
      (2) in response to authentication of said identifiers against said database, performing instantly the transaction by transferring funds from a first account to a second account.

28. Apparatus according to claim 27 in which said processor is programmed to receive said primary and secondary identifiers from different sources.

29. Apparatus according to claim 28 in which said processor is programmed to authenticate said transaction only if said primary and secondary identifiers are associated with each other on said database.

30. The apparatus of claim 27 wherein the telephone network comprises a wireless telephone network.

31. The apparatus of claim 27 wherein the first financial account is selected from a group consisting of a bank account, a credit card account, a debit card account and a prepaid card account.

32. The system of claim 27 wherein the transaction is cleared through an entity selected from a group consisting of an Electronic Funds Transfer network, a credit card network and an Automated Clearing House network.

33. The apparatus of claim 27 wherein the second financial account is selected from a group consisting of a bank account, a credit card account, a debit card account and a prepaid card account.

34. The apparatus of claim 27 wherein the database comprises information concerning one or more desired payment mechanisms and wherein said payment mechanisms are linked to said telephone number.

35. The apparatus of claim 27 wherein the database comprises information concerning one or more desired payment mechanisms and wherein said information is retrieved using the telephone for use in processing the transaction.

36. A method of securely conducting transactions over a network, comprising:
   A. initiating, in response to receipt of a text message seeking to initiate a transaction, a telephone call over the telephone network;
   B. obtaining, at a server, from the party to which the text message was initiated, an identifier unique to the party to which the telephone call was directed;
   C. communicating, by the server, said identifier to an entity that is enabled to authenticate the identifier by checking said identifier against a database of authorized users; and
   D. if at least said identifier matches that of an entity that is registered in said database, performing instantly the transaction by transferring funds from a first financial account to a second financial account using a second network.

37. The method of claim 36 in which said identifier is one that has been assigned by said entity to a device on which said call is being made.

38. The method of claim 36 wherein the first financial account is selected from a group consisting of a bank account, a credit card account, a debit card account and a prepaid card account.

39. The method of claim 36 wherein the transaction is cleared through an entity selected from a group consisting of an Electronic Funds Transfer network, a credit card network and an Automated Clearing House network.

40. The method of claim 36 wherein the second financial account is selected from a group consisting of a bank account, a credit card account, a debit card account and a prepaid card account.

41. The method of claim 36 wherein the database comprises information concerning one or more desired payment mechanisms and wherein said payment mechanisms are linked to said telephone number.

42. The method of claim 36 wherein the database comprises information concerning one or more desired payment mechanisms and wherein said information is retrieved using the telephone for use in processing the transaction.

* * * * *

UNITED STATES PATENT AND TRADEMARK OFFICE
CERTIFICATE OF CORRECTION

PATENT NO. : 7,742,984 B2
APPLICATION NO. : 09/899905
DATED : June 22, 2010
INVENTOR(S) : Hossein Mohsenzadeh Page 1 of 1

It is certified that error appears in the above-identified patent and that said Letters Patent is hereby corrected as shown below:

Col. 1, Line 55, please amend as shown:

the network. The individual can then access [[finds]]funds and banking

Col. 4, Line 49, please amend as shown:

an IP telephony network through a [[pre assigned]]pre-assigned IP gateway.

Col. 6, Line 56, please amend as shown:

following [[steps]]steps:

Col. 7, Line 62, please amend as shown:

[[Shop of Boston]]

Col. 7, Line 63, please amend as shown:

Shop of Boston $97.50 and charge my Empire Bank account number

Col. 8, Line 11, please amend as shown:

the [[finds]]funds are temporarily credited. The default account is

Col. 14, Line 54, please amend as shown:

number, may obtain transfer of the [[finds]]funds to his/her account

Col. 18, Line 1, please amend as shown:

instantly, at the [[sever]]server, the transaction by transferring

Signed and Sealed this

Seventh Day of September, 2010

David J. Kappos
*Director of the United States Patent and Trademark Office*